Oct. 14, 1958  M. L. FALLON  2,855,805
DIFFERENTIAL MECHANISM
Filed Sept. 30, 1957

INVENTOR.
MICHAEL L. FALLON
BY
*Richard W. Treverton*
ATTORNEY

United States Patent Office 2,855,805
Patented Oct. 14, 1958

2,855,805
DIFFERENTIAL MECHANISM

Michael L. Fallon, Rochester, N. Y., assignor to The Gleason Works, Rochester, N. Y., a corporation of New York Application September 30, 1957, Serial No. 687,028

3 Claims. (Cl. 74—711)

The present invention relates to a differential mechanism, particularly for use in an automotive axle drive, of the type which provides a substantial driving torque to both axle shafts even when one of the driving wheels has little traction.

The primary objective of the invention is a mechanism of this kind which will be effective for the purpose indicated and yet will be simple and inexpensive, rugged, and also very compact so as not to require any substantial increase in the size of its housing.

A differential mechanism according to the invention comprises a case, two bevel side gears rotatable within the case and at least one bevel pinion meshing with both side gears and supported for rotation with respect to the case about its own axis, one side gear being splined to one axle shaft and the other side gear having face coupling teeth on its back face, a coupling member rotatable in the case in co-axial relation with the side gears, said coupling member having coupling teeth on its front face mating with the coupling teeth on said other side gear and being splined to the other axle shaft, the coupling teeth being of positive pressure angle whereby drive torque transmitted through them urges relative axial displacement between the coupling member and said other side gear, a thrust bearing block disposed between the front faces of the side gears for transmitting axial thrust from said other side gear to said one side gear, and means for holding the block against rotation relative to the case, the case having internal side faces for bearing axial thrust loads exerted thereagainst by the coupling member and by said other side gear, said bearing surfaces, and also the surfaces of said block in contact with the front faces of the side gears, frictionally resisting differential action of the mechanism when such loads are imposed.

Preferably there are two co-axial bevel pinions meshing with both side gears, a pin carried by the case and supporting the pinions for rotation, and the block has an opening through which the pin extends for holding the block against rotation relative to the case. Preferably the block has a bore for rotatably receiving a front hub provided on the side gear which has the coupling teeth, for the purpose of centering the block; and the same side gear is held centered by the inter-engagement of its coupling teeth with the teeth of the coupling member.

The foregoing and other objects and advantages will appear from the following description of the preferred embodiment of the invention shown in the accompanying drawings, wherein.

Figure 1:
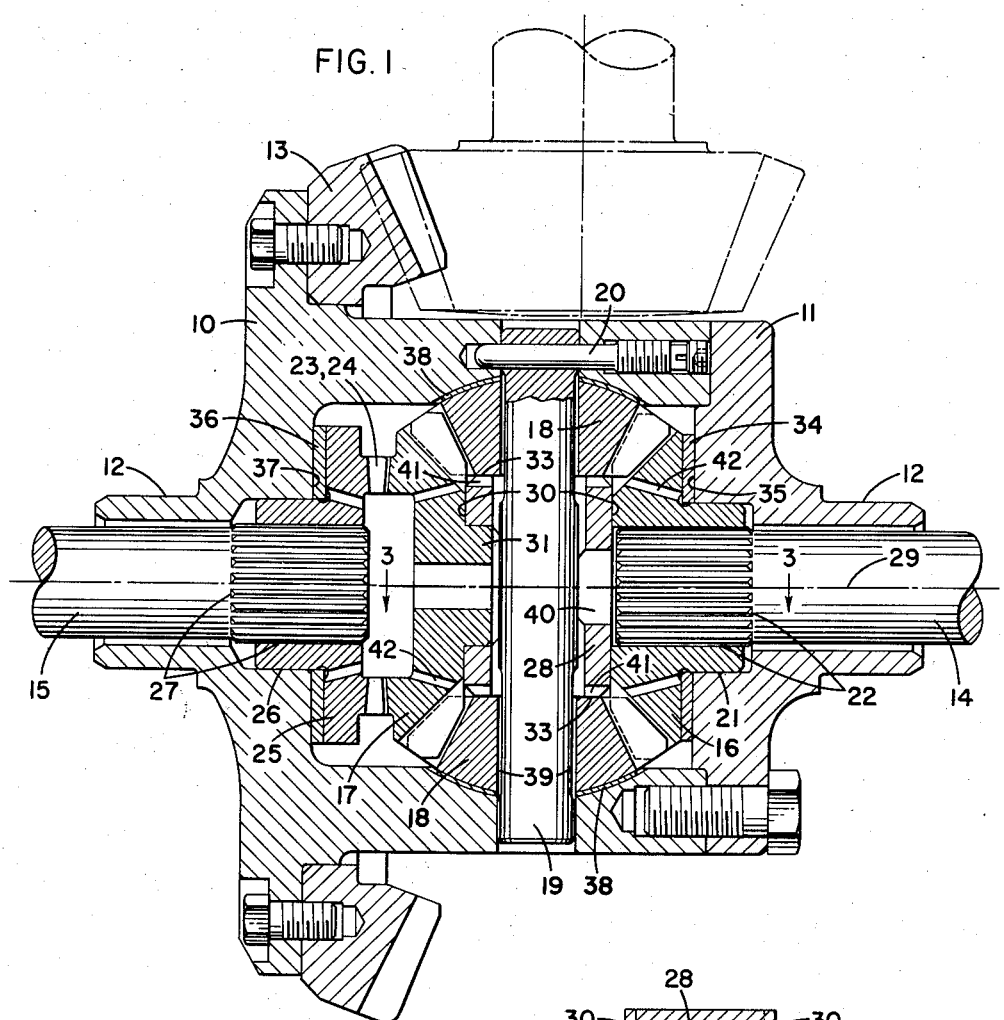
Fig. 1 is a section in a plane containing the axis of rotation of differential and axle shaft assembly.

The differential mechanism includes a case comprising a body 10 having secured thereto a cover 11. On these parts are trunnions 12 on which the case is journaled on bearings, not shown, for rotation in a suitable axle housing. A ring gear 13 secured to the case body 10 is adapted to mesh with a suitable drive pinion. The trunnions have central bores through which extend the axle shafts, designated 14 and 15. The differential gears consist of bevel side gears 16 and 17, and two bevel pinions 18 which mesh with both side gears. The pinions are rotatable on a pin 19 which extends diametrically through the case body 10 and is secured thereto by a screw 20.

Side gear 16 has a back hub 21 rotatable in a counterbore in case cover 11, and has a drive connection with axle shaft 14, the connection comprising interfitting splines 22 on the shaft and in a central bore through the gear. The other side gear 17 has face coupling teeth 23 on its back face, these teeth meshing with teeth 24 of a face coupling member 25. This member has a back hub 26 rotatable in a bore in body 10; and it has a drive connection with the other axle shaft 15, the connection comprising interfitting splines 27 on the shaft and on a central bore through the coupling member.

Disposed between the two side gears 16, 17, is a thrust bearing block 28 which has a transverse bore loosely receiving the pin 19. The pin holds the block against rotation relative to the case 10, 11, but allows it limited motion in the direction of the axis of rotation of the differential and axle shaft assembly, which axis is designated 29. The block has plane side faces 30 for bearing contact with the plane front faces of the side gears, and a central bore for rotatably receiving a front hub 31 of side gear 17. This hub serves to hold the block in centered relation to the axis 29. The side gear 17 is held centered by the inter-engagement of its coupling teeth 23 with the teeth 24 of clutch member 25. The block also has plane faces 33 adapted for bearing contact with the front faces of pinions 18. A thrust washer 34 is disposed between the internal side face 35 of the case and the back face of side gear 16; and a similar washer 36 is disposed between the opposite internal side face 37 of the case and the back face of coupling member 25. Spherical thrust washers 38 are disposed between the sperical back faces of the pinions and the recessed surfaces provided for them in the case.

To facilitate the circulation of lubricant through the assembly the pin 19 has flats 39 which provide channels communicating with the transverse bore in the block 28; the block has a central opening 40 and, in its faces 33, grooves 41 which also communicate with the transverse bore; and the side gears have drilled channels 42 extending from their back faces to the bottom lands of some of their inter-tooth spaces.

Figure 2:
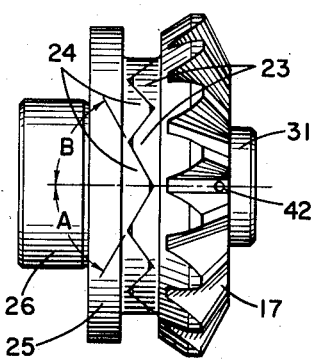
Fig. 2 is a side elevation of the coupling member and the side gear which meshes with it; and, Fig. 3 is a detail section in the plane designated 3—3 in Fig. 1.
Figure 3:
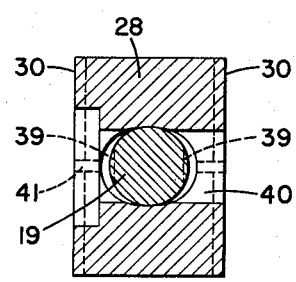

In operation the present mechanism differentiates in the conventional manner to divide the drive torque between the two axle shafts 14 and 15, and to allow one shaft to overrun the case and the other to underrun it when the vehicle is turning. However, unlike in the conventional differential, in the present mechanism the torque loads applied from the ring gear 13 to axle shaft 15, or vice versa, are transmitted through coupling teeth 23, 24. Because of the positive pressure angles of these teeth, which angles for the opposite sides of the teeth are designated respectively A and B in Fig. 2, this torque tends to cam the gear 17 and the coupling member 25 apart. The resulting thrust loads, in the direction of axis 29, are transmitted from the coupling member 25 through the washer 36 to surface 37 of the case, and from the gear 17 through thrust bearing block 28, gear 16 and washer 34 to surface 35 of the case. These thrust loads impose a frictional resistance to (a) rotation of gear 17 and washer 36 relative to case surface 37, (b) rotation of gear 17 relative to the block surface, (c) rotation of gear 16 relative to the block, and (d) rotation of gear 16 and washer 34 relative to the case surface 35. This frictional resistance to free differential action results in the application of a driving torque to both axle shafts, even when the vehicle wheel connected to one shaft is on a slippery surface or is bouncing on a rough surface and hence has little or intermittent traction; and thus improves the ability of the vehicle to cope with adverse road conditions. When the vehicle is making a turn the drive torque is usually reduced and hence there is little if any interference with the differential action then needed. The magnitude of the frictional resistance may be varied to suit any particular vehicle by varying the pressure angle of the teeth, since increase of angles A and B will result in a greater axial thrust for a given effective torque between ring gear 13 and axle shaft 15. In the illustrated embodiment angles A and B are equal, but in some cases it may be desirable to make them different to compensate for peculiarities in the steering or braking characteristics of a particular vehicle. The magnitude of the frictional resistance may also be varied in other known ways, as for example by making the washers 34, 36 and the block 28 of materials having different co-efficients of friction against the materials used for the case and the gears. However, I have obtained very satisfactory results using the illustrated differential mechanism in a medium-sized passenger car, which was otherwise conventional, employing pressure angles A and B both of sixty-five degrees and with the case, washers 34 and 36, block 28, and the gears all made of steel.

It will now be understood that the present mechanism is of rugged and simple construction, employing in addition to the components found in a conventional differential only two additional major parts, namely the coupling member 25 and the thrust bearing block 28. Provided that the materials from which the side gears and the case are made result in adequate frictional resistance and are suitable from the standpoint of wear, and provided also that the parts are manufactured to sufficiently close tolerances so that shimming is not required, the washers 34 and 36 may be omitted. The thrust bearing block 28 serves a triple purpose. It transmits thrust loads from one side gear to the other, so that there is frictional resistance to rotation of each side gear relative to the case, despite the fact that there is a coupling member adjacent only one side gear; it also provides two additional surfaces 30 that are stationary relative to the case and have frictional contact with the gears; and it serves to space the two side gears and thereby prevent wedging of the gear teeth or bottoming, i. e. unwanted contact between the tops of gear teeth with the root surfaces of mating teeth The disposition of the thrust bearing block in the space between two side gears, and the inclusion of but one coupling member, minimizes the number of parts and also renders the mechanism very compact, so that it requires little more space in an axle housing than a conventional differential.

Having now described my invention, and its operation, what I claim is:

1. A differential mechanism comprising a case, two bevel side gears rotatable within the case and at least one bevel pinion meshing with both side gears and supported for rotation with respect to the case about its own axis, one side gear being splined to one axle shaft and the other side gear having coupling teeth on its back face, a coupling member rotatable in the case in coaxial relation with the side gears, said coupling member having coupling teeth on its front face mating with the coupling teeth on said other side gear and being splined to the other axle shaft, the coupling teeth being of positive pressure angle whereby drive torque transmitted through them urges relative axial displacement between the coupling member and said other side gear, a thrust bearing block disposed between the front faces of the two side gears for transmitting axial thrust from said other side gear to said one side gear, and means for holding the block against rotation relative to the case, the case having internal side faces for bearing axial thrust loads exerted thereagainst by the coupling member and by said other side gear, said side faces, and also the surfaces of said block in contact with the front faces of the side gears, frictionally resisting differential action of the mechanism when such axial thrust loads are imposed.

2. A differential mechanism comprising a case, two bevel side gears rotatable within the case, two co-axial bevel pinions meshing with both side gears, a pin carried by the case and supporting the pinions for rotation, one side gear having a drive connection with one axle shaft and the other side gear having coupling teeth on its back face, a coupling member rotatable in the case in co-axial relation with the side gears, said coupling member having coupling teeth on its front face mating with the coupling teeth on said other side gear and having a drive connection with the other axle shaft, the coupling teeth being of positive pressure angle whereby drive torque transmitted through them urges relative axial displacement between the coupling member and said other side gear, and a thrust bearing block disposed between the front faces of the two side gears for transmitting axial thrust from said other side gear to said one side gear, said blocking having an opening through which the pin extends for holding the block against rotation relative to the case, the case having internal side faces for bearing axial thrust loads exerted thereagainst by the coupling member and by said other side gear, said side faces, and also the surfaces of said block in contact with the front faces of the side gears, frictionally resisting differential action of the mechanism when such axial thrust loads are imposed.

3. A differential mechanism according to claim 2 in which said other side gear has a front hub and said block has a bore for rotatably receiving said hub for being centered thereby, said other gear being centered by the inter-engagement of its coupling teeth with the teeth of the coupling member.

References Cited in the file of this patent
UNITED STATES PATENTS

| | | |
|---|---|---|
| 1,586,861 | Taylor | June 1, 1926 |
| 2,431,272 | Mynssen et al. | Nov. 18, 1947 |
| 2,720,796 | Schou | Oct. 18, 1955 |